US012014330B2

(12) United States Patent
Seacat Deluca et al.

(10) Patent No.: US 12,014,330 B2
(45) Date of Patent: *Jun. 18, 2024

(54) COLLABORATION PARTICIPANT INCLUSION

(71) Applicant: INTERNATIONAL BUSINESS MACHINES CORPORATION, Armonk, NY (US)

(72) Inventors: Lisa Seacat Deluca, Bozeman, MT (US); Jonathan D. Dunne, Dungarvan (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 196 days.

This patent is subject to a terminal disclaimer.

(21) Appl. No.: 17/131,773

(22) Filed: Dec. 23, 2020

(65) Prior Publication Data

US 2021/0304140 A1    Sep. 30, 2021

Related U.S. Application Data

(63) Continuation of application No. 16/831,653, filed on Mar. 26, 2020.

(51) Int. Cl.
*G06Q 10/10* (2023.01)
*G06F 40/20* (2020.01)

(52) U.S. Cl.
CPC .............. *G06Q 10/10* (2013.01); *G06F 40/20* (2020.01)

(58) Field of Classification Search
None
See application file for complete search history.

(56) References Cited

U.S. PATENT DOCUMENTS 6,029,195 A * 2/2000 Herz ................ H04N 21/25891
348/E7.071
6,785,681 B2  8/2004 Keskar et al.
(Continued)

FOREIGN PATENT DOCUMENTS

CN       103279858 A    9/2013
WO    20141205821 A1    8/2014

OTHER PUBLICATIONS

IBM: List of IBM Patents or Patent Applications Treated as Related, Mar. 25, 2021, 2 pg.

(Continued)

*Primary Examiner* — Quynh H Nguyen
(74) *Attorney, Agent, or Firm* — CUENOT, FORSYTHE & KIM, LLC (57) ABSTRACT

Participant inclusion determination can include generating a textual analysis of a draft of an electronic communication in response to a sender preparing the draft for conveyance over an electronic communications network. A word relevance score can be computed for each word of the draft based on the textual analysis. Probabilistically weighted distances between the sender, an initial recipient of the electronic communication, and more additional recipient candidates for additionally receiving the electronic communication can be determined. The probabilistically weighted distances can correspond to hierarchical distances within a hierarchical structure corresponding to an organization in which the sender, the initial recipient, and one or more additional recipient candidates are members. At least one of the additional recipient candidates can be selected for receiving the electronic communication over the electronic communications network based on the word relevance scores and the probabilistically weighted distances.

4 Claims, 7 Drawing Sheets

(56) References Cited

U.S. PATENT DOCUMENTS

| | | |
|---|---|---|
| 10,042,961 B2 | 8/2018 | Shen et al. |
| 10,204,084 B2 | 2/2019 | Qadir et al. |
| 2003/0028524 A1* | 2/2003 | Keskar .................. G06Q 30/02 |
| 2009/0049140 A1* | 2/2009 | Stoddard .............. G06Q 10/107 |
| | | 709/206 |
| 2010/0057861 A1 | 3/2010 | Nigam et al. |
| 2015/0106702 A1* | 4/2015 | Scott ..................... G06F 40/166 |
| | | 715/265 |
| 2020/0050638 A1* | 2/2020 | Hancock ........... G06F 16/90344 |
| 2020/0402015 A1* | 12/2020 | Ozcaglar ............... G06F 16/906 |

OTHER PUBLICATIONS

Seacat Deluca, L. et al., "Collaboration Participant Inclusion", U.S. Appl. No. 16/831,653, filed Mar. 26, 2020, 41 pages (A copy is not provided as this application is available to the Examiner.).

Mell, P. et al., The NIST Definition of Cloud Computing, National Institute of Standards and Technology, U.S. Dept. of Commerce, Special Publication 800-145, Sep. 2011, 7 pg.

* cited by examiner

Generate a textual analysis of a draft of an electronic communication in response to a sender preparing the draft for conveyance over an electronic communications network

402

Compute a word relevance score for each word of the draft based on the textual analysis

404

Determine probabilistically weighted distances between the sender, an initial recipient of the electronic communication, and one or more recipient candidates for additionally receiving the electronic communication, the probabilistically weighted distances corresponding to hierarchical distances within a hierarchical structure corresponding to an organization in which the sender, the initial recipient, and one or more recipient candidates are members

406

Select based on the word relevance scores and the probabilistically weighted distances at least one of the recipient candidates for receiving the electronic communication over the electronic communications network

COLLABORATION PARTICIPANT INCLUSION

BACKGROUND

This disclosure relates to electronic communications, and more particularly, to collaborative communications using one or more collaboration tools or messaging platforms.

Electronic communications via a local area network (LAN), wide area network (WAN), the Internet, or other electronic communications network enable individuals remotely situated from one another to connect, share information, and engage in conversations. Conversations are enhanced with the use of messaging platforms. Social networking platforms, for example, enable users to build social relationships with others who share common personal or career interests. Team collaboration tools enable users who are jointly working on a project or task to share, process, and manage files, documents, and data, as well as communicate with one another so as to more efficiently accomplish a task or complete a project.

SUMMARY

In one or more embodiments, a method can include generating a textual analysis of a draft of an electronic communication in response to a sender preparing the draft for conveyance over an electronic communications network. The method also can include computing word relevance scores for each word of the draft based on the textual analysis. Additionally, the method can include determining probabilistically weighted distances between the sender, an initial recipient of the electronic communication, and each of a plurality of recipient candidates for additionally receiving the electronic communication. The probabilistically weighted distances can correspond to hierarchical distances within a hierarchical structure corresponding to an organization associated with the sender, the initial recipient, and the plurality of recipient candidates. The method also can include selecting based on the word relevance scores and the probabilistically weighted distances at least one of the plurality of recipient candidates for receiving the electronic communication over the electronic communications network.

In one or more embodiments, a system includes a processor configured to initiate operations. The operations can include generating a textual analysis of a draft of an electronic communication in response to a sender preparing the draft for conveyance over an electronic communications network. The operations also can include computing word relevance scores for each word of the draft based on the textual analysis. Additionally, the operations can include determining probabilistically weighted distances between the sender, an initial recipient of the electronic communication, and each of a plurality of recipient candidates for additionally receiving the electronic communication. The probabilistically weighted distances can correspond to hierarchical distances within a hierarchical structure corresponding to an organization associated with the sender, the initial recipient, and the plurality of recipient candidates. The operations also can include selecting based on the word relevance scores and the probabilistically weighted distances at least one of the plurality of recipient candidates for receiving the electronic communication over the electronic communications network.

In one or more embodiments, a computer program product includes at least one non-transitory computer-readable storage medium having instructions stored thereon. The instructions are executable by a processor to initiate operations. The operations can include generating a textual analysis of a draft of an electronic communication in response to a sender preparing the draft for conveyance over an electronic communications network. The operations also can include computing word relevance scores for each word of the draft based on the textual analysis. Additionally, the operations can include determining probabilistically weighted distances between the sender, an initial recipient of the electronic communication, and each of a plurality of recipient candidates for additionally receiving the electronic communication. The probabilistically weighted distances can correspond to hierarchical distances within a hierarchical structure corresponding to an organization associated with the sender, the initial recipient, and the plurality of recipient candidates. The operations also can include selecting based on the word relevance scores and the probabilistically weighted distances at least one of the plurality of recipient candidates for receiving the electronic communication over the electronic communications network.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While this disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The disclosure relates to electronic communications, and more particularly, to collaborative communications using one or more collaboration tools or messaging platforms. Notwithstanding the efficiencies provided to an organization communicating via such platforms, especially if in conjunction with various collaboration tools, communicating within an organization can pose challenges. A business or other organization may comprise a large number of individuals. Thus, it may be difficult to determine which individuals in which circumstances should be included on which communications. Moreover, with respect to organizations generally and team structures specifically, members of the organization and the role of each can change over time. New members may join, old members may leave, and existing members may change roles within the organization. For example, department head Smith may be elevated to executive vice president and be replaced by Jones as the new head of a department, making it difficult for individuals within the department to ensure that communications that merit copying to the department head are timely and appropriately conveyed. The problem is only compounded, for example, if the administrative assistant on whom the department head relies to field many communications changes positions within the organization.

In accordance with the inventive arrangements disclosed herein, a communication from one member of an organization is automatically directed to one or more appropriate addressees within the organization. In various embodiments, the determination of who among various members of the organization should receive the communication is a probabilistic determination based on discourse analysis and a conjunctive analysis of a hierarchal structure corresponding to the organization. The same techniques apply equally with respect to communications on one or more messaging platforms involving members of a group (e.g., chat group) that is represented by a hierarchical structure.

A "hierarchical structure," as defined herein, is logical construct that links an identity of a member of an organization with a position relative to other members of the organization. For example, in the context of a business enterprise, a named individual's position may correspond to the individual's role within the organization, such as Joan Smith, CEO, David Jones, VP of Research and Development, or any other role (e.g., department head, team leader, intern) with the organization. The named individual's position can correspond to the individual's level of seniority. Other information can be associated with the named individual, such as projects the individual is currently working on, memberships in one or more collaboration teams, the name of the individual's administrative assistant as applicable, or similar information.

One aspect of the arrangements disclosed herein is an ability for a system to automatically determine which individuals (e.g., executives, department heads, administrative assistants, team members) within an organization should receive a communication (message). The determination is made with respect to a draft of the communication, which is analyzed prior to conveyance of the communication over an electronic communications network. This aspect makes it likely that every individual within the organization—especially ones from whom a response is needed or desired—are among the addresses of the communication.

Another aspect pertains to situations in which memberships within the organization and the roles of members change over time. Changes can be reflected in a hierarchical structure representing the organization and used for analysis of a draft text of a communication to determine to whom the communication should be directed. Thus, notwithstanding organizational changes—a not uncommon occurrence within many organizations—every individual within the organization who should receive a communication is automatically selected. For example, if Smith replaces Jones as a department head, a communication that needs to be received by the department head is automatically redirected to Smith. The redirection is independent of the sender's selection of addressees and is based on a discourse analysis and conjunctive analysis of a hierarchal structure corresponding to the organization, which automatically identifies the department head as a recipient of the communication.

Still another aspect relates to logical links among members within an organization based on the members respective roles. For example, an executive may be logically linked to an executive assistant, while multiple team members may be linked with one another for the duration of a project on which the team members are collaborating. In various embodiments, the analysis of the draft text can be based on a hierarchical structure that logically links members of an organization according to predetermined organizational attributes. Accordingly, a determination that, based on analysis of a draft text, a communication should be directed to a first member of an organization is also a determination that the communication should be directed to a second member logically linked to the first. For example, determining that a communication should be directed to an executive automatically also directs the communication to the executive's administrative assistant. Optionally, if a machine-selected recipient (e.g., executive) is de-selected by the drafter of a communication, then any logically linked individual (e.g., executive assistant) is automatically de-selected as well.

Determining who among a plurality of organization members should receive an electronic communication over an electronic communications network can include generating a textual analysis of a draft of the electronic communication. In various embodiments, the textual analysis can comprise a corpus linguistic analysis generated using various linguistic methodologies or techniques. A corpus linguistic analysis, in some embodiments, infers both the frequency of each word in the draft and collocations (e.g., two- or three-word patterns or n-tuples) of frequently occurring words within the draft. A relevance score or other indication of relative importance can be assigned to each word in the text. A relevance score can be computed by modeling the word occurrences as a stochastic process having a complicated or unknown distribution and computing a value (between 0 and 1) using, for example, Gibbs sampling.

A corresponding analysis of a hierarchical structure of the organization can generate probabilistically weighted distances between the sender of the electronic communication, an initial recipient, and multiple additional recipient candidates. The probabilistically weighted distances can be determined by modeling organization members' positions within the hierarchical structure as a stochastic process. For example, the stochastic process can be analyzed as one in which each member of the hierarchy at one level generates a random number of members at a succeeding level, that is a branching process.

In another aspect, the analysis based on computed relevance scores and the analysis based on probabilistically weighted distances can be conjoined to derive a participant inclusion model (PIM). Derivation of a PIM, as described herein, comprises certain computational and logical operations, over a set of results, for combining a relevance measure (e.g., log-likelihood value) and a distance measure. The PIM can provide values corresponding to potential recipients for determining which of the potential recipients should receive a communication. The PIM can be integrated in or operatively coupled to various types of collaboration tools and platforms (e.g., IBM Verse™ Outlook™, Slack™). As membership and positions within the organization change, the hierarchical structure and PIM change accordingly.

The arrangements described herein are directed to computer technology and provide an improvement to computer technology. One improvement relates to the operative capacity of collaboration tools and messaging platforms (e.g., collaboration platform, social networking platform, email messaging platform). Automatically addressing electronic communications based on a hierarchical structure of an organization can result in fewer messages transmitted through a data communications network owing to less message forwarding, fewer inquiries about where to send messages, and fewer misdirected messages.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
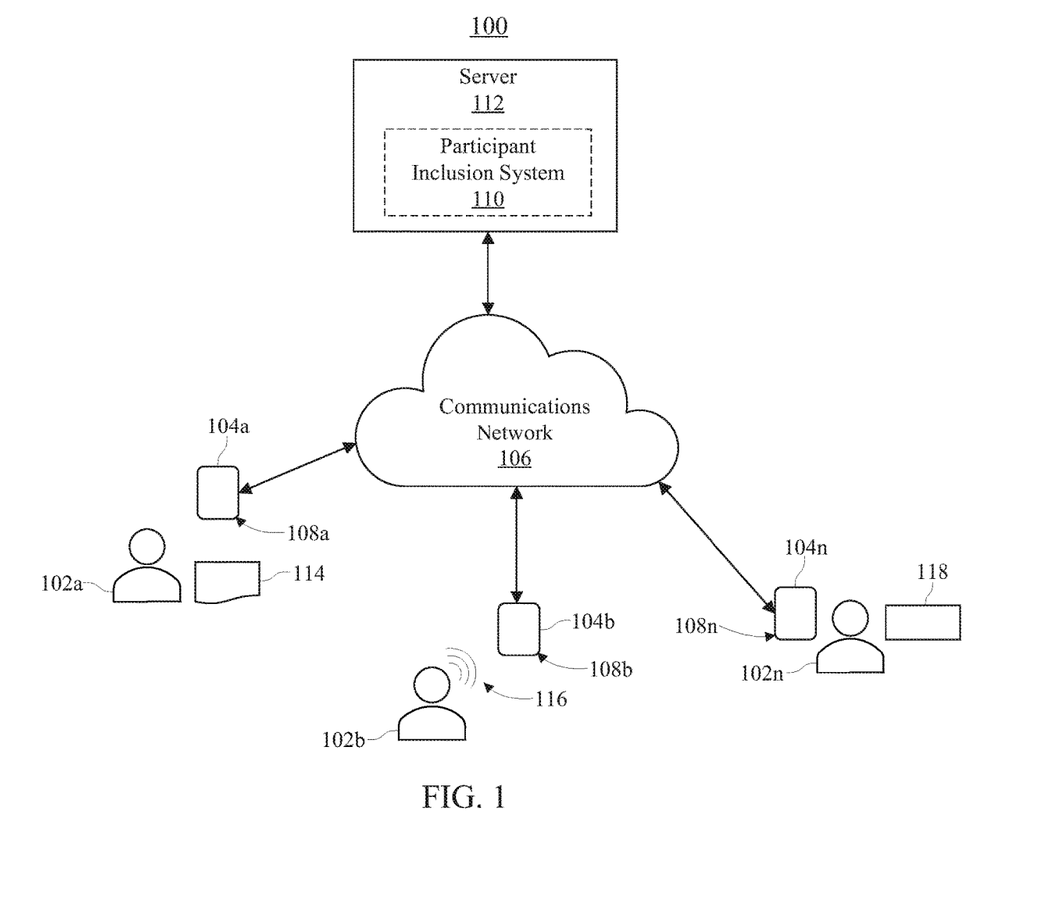
FIG. 1 depicts an example communication environment in which a participant inclusion system is operable according to an embodiment.

Referring initially to FIG. 1, example communication environment 100 is depicted. Illustratively, example communication environment 100 includes multiple users 102a, 102b, and 102n who communicate with one another using communication devices 104a, 104b, and 104n, respectively. Although only three such users and user devices are shown, it will be readily recognized that example communication environment 100 can include many more users and user devices or as few as only two.

Communication devices 104a-104n can comprise various types of electronic devices, including, for example, a smartphone or other mobile device, a computer (e.g., desktop, laptop, tablet computer), virtual assistant, smart TV, or other communication/computing device. It will be appreciated that in various embodiments one or more of communication devices 104a-104n can be deployed as a standalone device or deployed as multiple devices in a distributed client-server networked system. For example, in certain embodiments, a smartwatch can operatively couple to a mobile device (e.g., cell phone).

Illustratively, communication devices 104a-104n communicatively couple with one another via electronic communications network 106. Electronic communications network 106 provides communication links between various devices and data processing systems. Electronic communications network 106 can link users 102a-102n using communication devices 104a-104n, for example, to an instant messaging service, a team collaboration service, a social networking service, or similar service or messaging platform. The communication links can include connections, such as wired communication links, wireless communication links, or fiber optic cables, and can be implemented as, or include, one or more (or any combination of) different communication technologies such as a wide area network (WAN), a local area network (LAN), a wireless network (e.g., a wireless WAN and/or a wireless LAN), a mobile or cellular network, a virtual private network (VPN), the Internet, a public switched telephone network (PSTN), and so forth.

As defined herein, "communication link" means a mode of communication using one or more electronic devices. A communication link is associated with a specific format and/or communication protocol for sending messages. For example, using a specific format and/or communication protocol, an electronic device can send a message to another electronic device as a text message, an email, a video call, a voice call, and/or a post to a social networking system or team collaboration platform. A communication link for exchanging text messages is considered a distinct communication link. Likewise, a communication link for exchanging emails is a distinct communication link, as is a communication link for video calls and a communication link for voice calls. So, too, a communication link used for posting to a social networking system or team collaboration platform is considered a distinct communication link. Accordingly, each type of communication link corresponding to a different type or mode of communication is considered a distinct communication link.

Each of communication devices 104a-104n is endowed with processing capabilities and/or circuitry 108a, 108b, and 108n that connects to an instant messaging service, a team collaboration service, a social networking service, and/or similar service or messaging platform via electronic communications network 106. Participant inclusion system 110, according to an embodiment, can be operatively coupled to or integrated in an instant messaging service, a team collaboration service, a social networking service, or similar service or messaging platform to which communication devices 104a-104n are communicatively linked via electronic communications network 106. Indeed, participant inclusion system 110 can be operatively combined with any networking, collaboration, or messaging platform, such as ones using an application layer protocol (e.g., Internet Relay Chat, XMPP, or similar proprietary protocol) for communications—both group communications in discussion forums ("channels) and one-to-one communications via private messaging platforms—as well as for data transfers and file sharing. Participant inclusion system 110 optionally can include a speech-to-text processor for converting voice into text to enable the system to perform the functions described herein with respect to voice-based communications as well as text-based communications.

Participant inclusion system 110, in certain embodiments, is implemented as a set of computer system-executable instructions illustratively executing on server 112, which can communicatively couple to communication devices 104a-104n via electronic communications network 106. Accordingly, participant inclusion system 110 can be implemented in various types of computer systems (e.g., cloud-based server), such as computer system 712 described with reference to FIG. 7. In various embodiments, participant inclusion system 110 can be implemented in computer system-executable instructions, in dedicated circuitry, or in a combination of circuitry and computer system-executable instructions. Illustratively, user 102a communicates text message 114, user 102b communicates spoken message 116, which is converted to text by a speech-to-text processor (not shown), and user 102n communicates a message containing image 118, each of which is conveyed over electronic communications network 106.

Users 102a-102n may be members of the same organization. For example, users 102a-102n each may be employed by or work in the same business enterprise, non-profit organization, governmental entity, or other such organization. Within the organization, users 102a-102n may communicate among themselves and/or with other members of the organization. Participant inclusion system 110, integrated in or operatively coupled with the collaboration tools or otherwise communicatively linked to communication devices 104a-104n via electronic communications network 106, determines recipients for communications—whether as text, speech converted to text, and/or comprising video—that are drafted by members of the organization, the determination being made prior to conveyance of the communication via electronic communications network 106.

Figure 2:
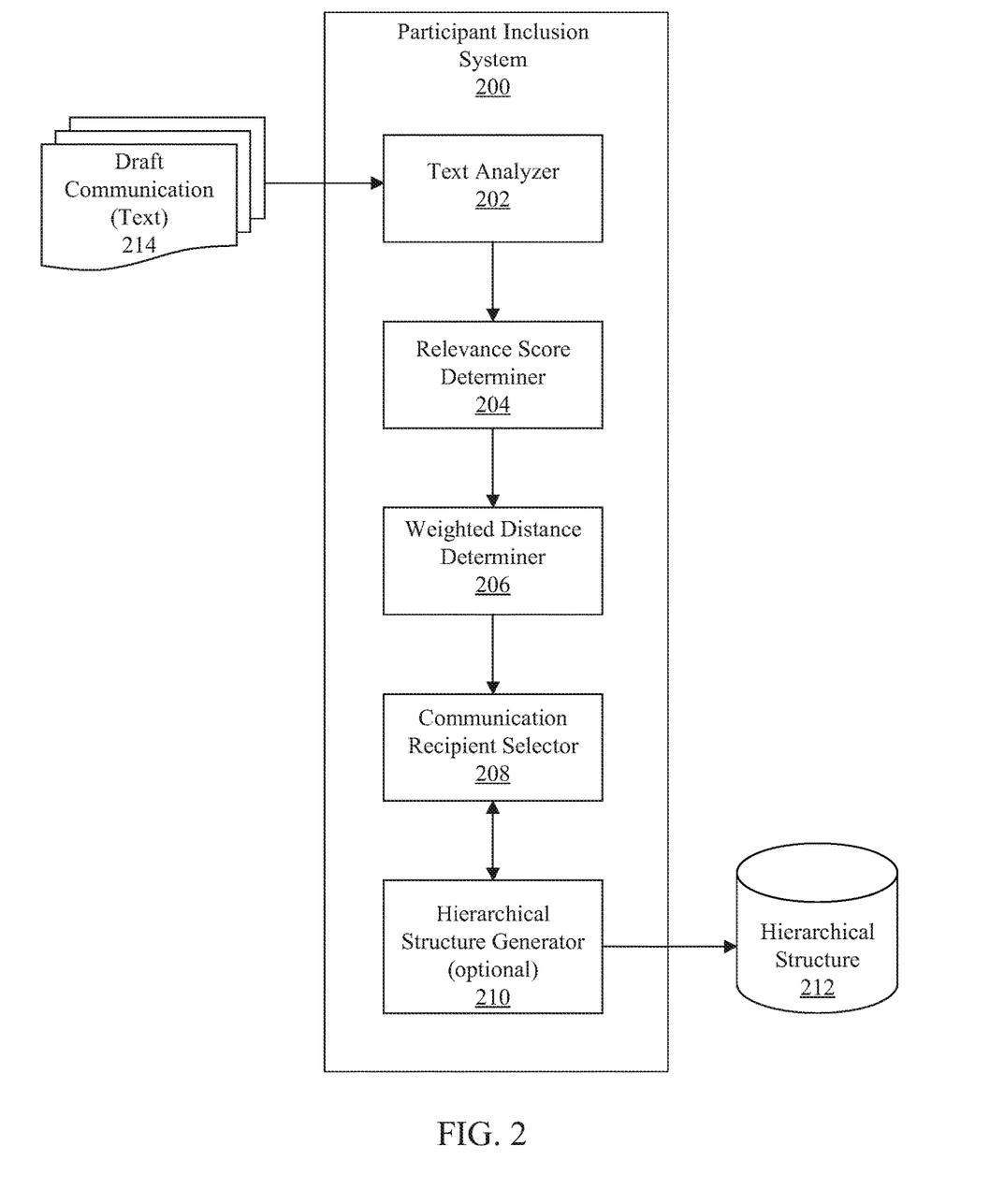
FIG. 2 depicts an example participant inclusion system according to an embodiment.

FIG. 2 depicts example participant inclusion system 200 according to an embodiment. Participant inclusion system 200 illustratively includes text analyzer 202, relevance score determiner 204, weighted distance determiner 206, and communication recipient selector 208. Text analyzer 202, relevance score determiner 204, weighted distance determiner 206, and communication recipient selector 208 can be implemented in computer system-executable instructions (software), dedicated circuitry, or a combination of software and dedicated circuitry.

Text analyzer 202 analyzes the text of a draft of an electronic communication (message) prior to conveyance of the electronic communication by a sender to an initial recipient and one or more potential recipients (additional recipient candidates) over one or more data communications networks. The sender and the one or more potential recipients may be members of the same organization. A hierarchical structure can be constructed, the hierarchical structure corresponding to the organization and indicating a potential recipient's position within the hierarchical structure based on one or more predetermined criteria, as described below. The hierarchical structure provides a pool or array of multiple recipient candidates, arranged hierarchically.

The hierarchical structure can correspond, for example, to a server-based directory residing in the computer memory of one or more computing nodes maintained by or for the organization. A standards-based mechanism that provides authentication and information storage pertaining to individual users, user groups, and/or applications can embody the hierarchical structure. For example, the hierarchical structure can correspond to the Lightweight Directory Access Protocol (LDAP) for providing general-purpose data storage within the context of a variety of different applications. The hierarchical structure thus can correspond to a hierarchically arranged array of recipient candidates based on the LDAP or other organization structure. Optionally, participant inclusion system 200 can include hierarchical structure generator 210 for generating the hierarchical structure corresponding to the organization. The hierarchical structure generated can be electronically stored in data store 212.

In certain embodiments, text analyzer 202 analyzes the text of a draft communication 214 using one or more methods drawn from the field of corpus linguistics. Corpus linguistic methods can include, for example, speech tagging, parsing, statistical evaluations, rules-based optimization, knowledge discovery, and other such methods for analyzing text. For example, a corpus linguistic method for determining distinct parts of speech or grammatical structure of a text can tag words as corresponding to a specific part of speech and/or identify the context of words. A corpus linguistic method, for example, can specify the relationship between adjacent and related words in a phrase, sentence, or paragraph. For example, a simplified form of part-of-speech analysis (tagging) can comprise identifying words as nouns, verbs, adjectives, adverbs, and the like. Such part-of-speech analysis in the context of computational linguistics, for example, can associate discrete terms, as well as hidden parts of speech, in accordance with a set of descriptive tags using a rule-based or stochastic algorithm.

Corpus linguistic analysis can determine a link between two or more content terms based on various factors. For example, a link between two words can include consideration of the frequency with which two words are used together. The link can be determined based on how two words are used together in a sentence (e.g., the order of the words, the degree of separation of the words, the physical distance between the words, which component of the sentence each word makes up). Using one or more such corpus linguistic methods or techniques, text analyzer 202 in certain embodiments can compute a term frequency (of occurrences) of each word within the text of a communication (message) and the collocations (e.g., 2-tuples, 3-tuples) of frequently occurring words within the communication.

Relevance score determiner 204 computes a relevance score for each word in a draft of an electronic communication. A relevance score can be computed based on the textual analysis of the draft generated by text analyzer 202. For example, the name of one or more members of the organization may occur with relatively high frequency (term frequency) within two or three words (collocation) related to a specific topic. The term frequency and collocation can be used to infer whether the named member(s) should be included in a communication pertaining to the specific topic. For example, a high term frequency of a member's name collocated with an identified topic can imply that the name should be selected for receiving the electronic communication.

Quantitatively, the relevance scores determined by relevance score determiner 204 can correspond to a value such as a log-likelihood value. A log-likelihood value, between 0 and 1, corresponds to a probabilistically determined importance of the word in the context of the draft in which the word appears. In certain embodiments, relevance score determiner 204 computes the relevance scores by modeling the occurrence of words within the draft as a stochastic process. Using Gibbs sampling, slice sampling, or other Markov Chan Monte Carlo method, relevance score determiner 204 can determine a relative importance of words in the draft. Gibbs sampling, for example, can infer an underling probability distribution of words within the text that can be used to compute a probabilistically determined value representing the importance of each word.

Weighted distance determiner 206 determines probabilistically weighted distances between the sender of the electronic communication, an initial recipient, and each potential additional recipient (recipient candidate) of the electronic communication. The probabilistically weighted distances are determined by weight distance determiner 206 analyzing the hierarchical structure corresponding to the specific organization with which the sender, the initial recipient, and recipient candidates are all associated as members.

Operatively, weighted distance determiner 206 can identify positions in the hierarchical structure of the sender, the initial recipient, and each recipient candidate. The positions can correspond to the relative ranks of the sender, initial recipient, and recipient candidates within the organization, ranging from the most senior rank to the lowest rank. Weighted distance determiner 206 can divide the relative positions into strata. Each of the strata can represent a "probabilistic slice," defined herein as the probability that a potential recipient (recipient candidate) should receive a communication. The probability is commensurate with a distance represented by the number of strata separating a potential recipient from a "root," either the sender or the initial recipient.

Figure 3:
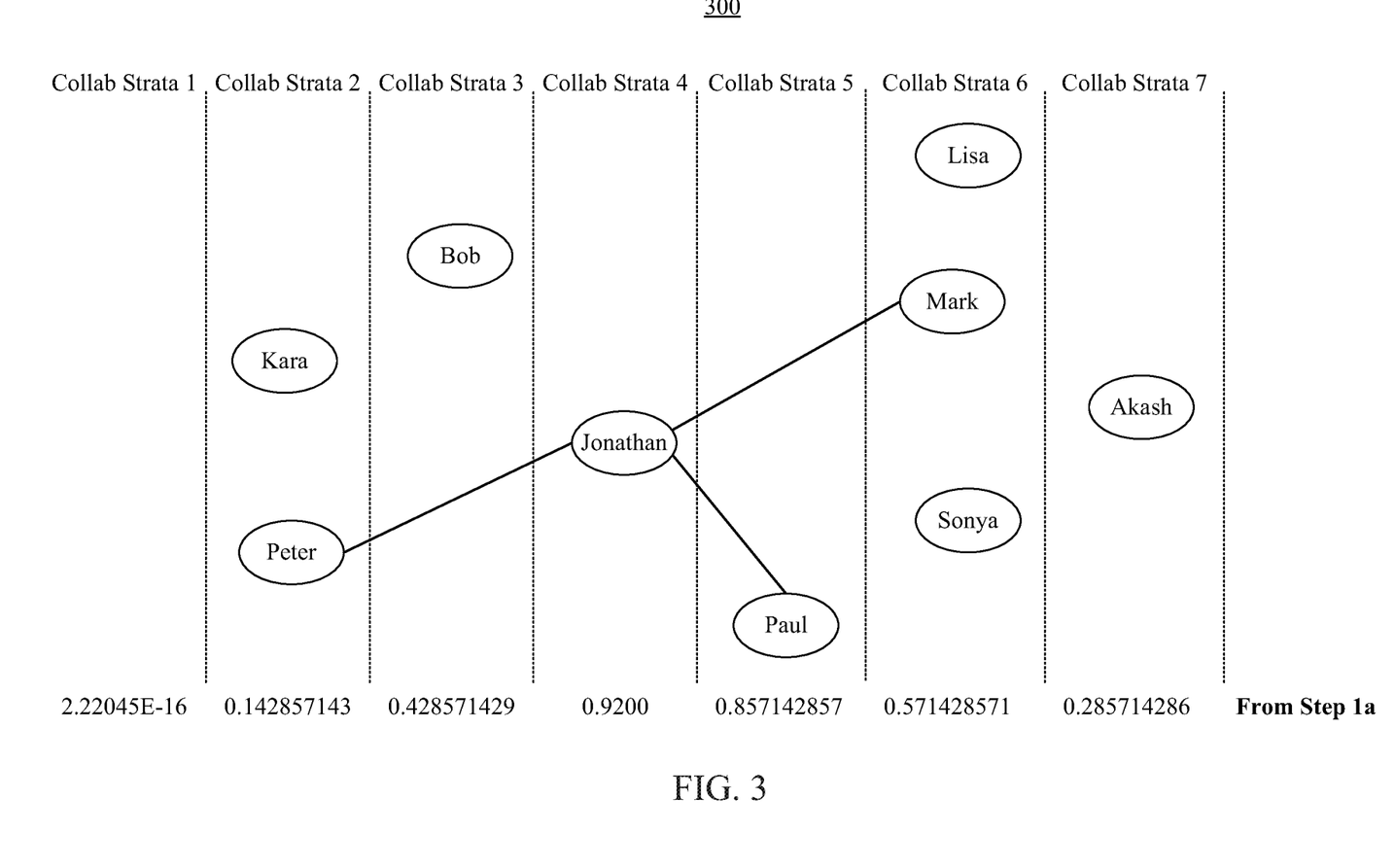
FIG. 3 depicts an example pattern of probability slices used by a participant inclusion system according to an embodiment.

Referring additionally to FIG. 3, a portion 300 of an example hierarchical structure is depicted. Portion 300 comprises seven collaboration strata, Collab Strat 1 through Collab Strat 7. Illustratively, Jonathan within Collab Strat 4 serves a root. The probability that a potential recipient who is positioned within one of the strata should receive a communication is listed at the bottom of each of the strata. The probabilities correspond to a specific probability model applied by weighted distance determiner 206. Based on the model, the probability assigned to Jonathan is close to one, though not quite, consistent with the assumption that Jonathan is the root (sender or initial recipient). The probabilities decrease the farther removed each of the strata is from the root.

The operative features of weighted distance determiner 206 can illustrated in the context of the following example message:

"Hey guys, I had this fantastic idea for a new type of supply chain system. Mark and Paul, is this something we have discussed before in our scrums? Peter on our monthly previous all-hands call we spoke about the need to develop a new type of supply chain,"

Mark, Paul, and Peter are potential recipients. Based on the relative positions of Mark, Paul, and Peter within the hierarchical structure, as well as the probabilities assigned to each of the strata based on the underlying probability model, there are distinct probabilistically weighted distances assigned to each of Mark, Paul, and Peter by weighted distance determiner 206. Illustratively, the probabilistically weighted distances assigned to Mark, Paul, and Peter are approximately 57 percent, 86 percent, and 14 percent, respectively.

The model for determining weighted probabilistic distances can be combined with the model described above for computing relevance scores. The combination defines a participant inclusion model (PIM) that yields a PIM score for each of multiple recipient candidates for receiving an electronic communication via an electronic communications network. PIM scores can be based on relevance scores and probabilistically weighted distances. A relevance score can be assigned to a recipient candidate based on the relative importance of one or more references to the recipient candidate in a draft of a communication, determined as described above with respect to relevance score determiner 204. A probabilistically weighted distance corresponding to the distance within a hierarchical structure between the recipient candidate and a root (sender or initial recipient) can be determined as described with respect to weighted distance determiner 206. A PIM score can be computed as the product of the relevance score and the probabilistically weighted distance. For example, in the above example, if a computed relevance score for Mark is 0.975, then given the 0.517 probabilistically weighted distance assigned to Mark based on Mark's position relative to the root (Jonathan), then Mark receives a PIM score of 0.504.

Referring still to FIG. 2, communication recipient selector 208 selects one or more recipients from among plurality of recipient candidates to receive the electronic communication over the electronic communications network, the selection (s) based on word relevance scores and probabilistically weighted distances. Optionally, recipient candidates selected for receiving the electronic communication can be presented to the sender prior to conveying the electronic communication over the electronic communications network. In some embodiments, the sender can affirm one or more selections, in which event participant inclusion system 200 automatically conveys the electronic communications to only those recipient candidates whose selection has been affirmed. In other embodiments, the sender can negate selections such that the communication is conveyed by participant inclusion system 200 to only those recipient candidates who are automatically selected and whose selection is not negated by the sender.

In certain embodiments, participant inclusion system 200 can present all recipient candidates to the sender, each presentation accompanied by a PIM score or other probabilistic measure based on a word relevance score and probabilistically weighted distance that indicates a probability that the corresponding recipient candidate should receive the electronic communication. For example, in certain embodiments, visual representations of recipient candidates can be presented on a display of a sender's device, such as display 714 of computer system 712 in FIG. 7. Each visual representation, for example, can be visually modified or altered (e.g., color coded, annotated, etc.) to indicate the probability that the corresponding recipient candidate should receive the electronic communication.

In other embodiments, the hierarchical structure analyzed by weighted distance determiner 206 can represent each recipient candidate using an n-tuples or other structure. An n-tuple or other structure can include an identifier (e.g., name of the recipient candidate) and one or more organizational attributes (e.g., recipient candidate's role within the organization). For example, the 3-tuple [Dora Jones, VP of R&D, Jen Smith] corresponds to a recipient candidate named Dora Jones whose role within the organization is Vice President of Research and Development, and whose executive assistant is Jen Smith. An organizational attribute can specify, for example, not only a recipient candidate's role within an organization, but also a logical link between one member of the organization (e.g., executive) and another member (e.g., executive assistant).

Participant inclusion system 200 can select an additional communication recipient for receiving a communication based solely on the additional communication recipient's logical link to a recipient candidate selected by communication recipient selector 208. The additional communication recipient can be selected based on the logical link even though not represented in the hierarchical structure. For example, a hierarchical structure n-tuple may establish a logical link between VP of R&D Dora Jones and Jones' administrative assistant, Jen Smith. In response to selection of recipient candidate Jones, participant inclusion system 200 also selects Jen Smith based on Smith's logical link to Jones. Moreover, if participant inclusion system 200 provides the sender a capability to ensure that only a recipient candidate whose selection is affirmed or not negated receives a communication, the additional communication recipient can be automatically de-selected in response to a sender's negation or failure to affirm selection of a logically linked recipient candidate. For example, if Smith is selected based on a logical link to Jones, then the sender's de-selecting Jones automatically de-selects Smith for receiving the electronic communication.

Another organizational attribute that can be represented in the hierarchical structure is a role within the organization of each member, as described above. In certain embodiments, participation inclusion system 200 selects a replacement recipient who is a member of the organization for receiving the electronic communication in response to a recipient candidate originally selected being replaced in a role within the organization, wherein the replacement recipient and the recipient candidate originally selected share a common organizational attribute. For example, selection of recipient candidate Smith as a department head, may be replaced with recipient Jones in response to a determination that Jones has replaced Smith as the department head.

In other embodiments, text analyzer 202 can implement a corpus linguistic method for classifying the writing style of the draft of an electronic communication. Probabilistically weighted distances can be determined by weighted distance determiner 206 according to a classification of the writing style. For example, responsive to the writing style of a draft being classified as formal, the probabilistically weighted distances can be biased in favor of more senior ranked hierarchical positions, given that formal communications are more likely to be directed to more senior members of an organization (e.g., senior executives in a business organization or governmental entity). Conversely, classifying the writing style of the draft as informal can bias probabilistically weighted distances in favor of equally or lower ranked hierarchical positions (e.g., team members or subordinates).

Figure 4:
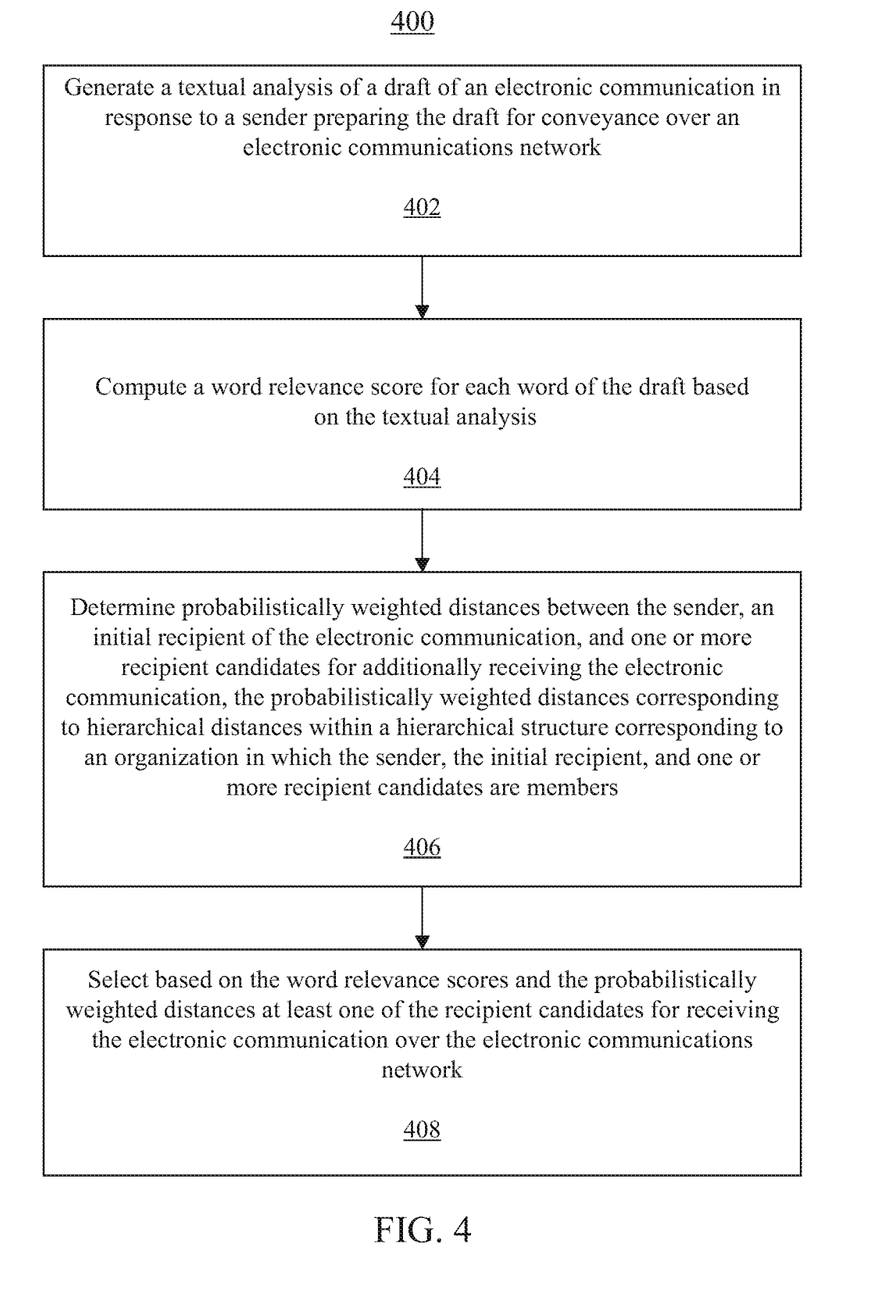
FIG. 4 is a flowchart of a method for automatically selecting recipients for receiving a communication over an electronic communications network according to an embodiment.

FIG. 4 is a flowchart of method 400 for determining participant inclusion according to an embodiment. Method 400 can be implemented in a system the same or similar to the systems described in relation to FIGS. 1-3. The system at block 402 generates a textual analysis of a draft of an electronic communication in response to a sender preparing the draft for conveyance over an electronic communications network. At block 404, the system computes a word relevance score for each word of the draft based on the textual analysis. In some embodiments, the textual analysis determines a word frequency of each word of the draft and collocations of frequently occurring words within the draft. The word relevance scores can be computed by statistically determining each word's relevance score based on the word frequency of each word and the collocations of frequently occurring words. The system, in certain embodiments, can compute relevance scores using a Markov Chan Monte Carlo algorithm, such as Gibbs sampling, slice sampling, or similar such algorithm.

The system at block 406 determines probabilistically weighted distances between the sender, an initial recipient of the electronic communication, and one or more recipient candidates for additionally receiving the electronic communication. The probabilistically weighted distances correspond to hierarchical distances within a hierarchical structure corresponding to an organization in which the sender, the initial recipient, and one or more recipient candidates are members. In some embodiments, the system can determine probabilistically weighted distances by modeling the hierarchical structure as a stochastic process, such as branching process.

At block 408, the system selects one or more recipient candidates to receive the electronic communication over the electronic communications network. The system selects one or more recipient candidates for receiving the electronic communication based on the word relevance scores and the probabilistically weighted distances.

At least one of the recipient candidates selected to receive the electronic communication can be logically linked with a member of the organization. The system additionally, based on the logical link, can select the member for receiving the electronic communication in response to the selecting a logically linked recipient candidate. A logically linked member of the organization also can be de-selected for receiving the electronic communication in response to the sender de-selecting the logically linked recipient candidate after recipient candidate was selected.

The hierarchical structure analyzed by the system can include organizational attributes associated with each member of the organization. Each organizational attribute can correspond to a role within the organization of each member, for example. The system can select a replacement recipient who is a member of the organization for receiving the electronic communication in response to a recipient candidate originally selected being replaced in a role within the organization. The replacement recipient can be selected by the system based on the replacement recipient and the originally selected recipient candidate sharing a common organizational attribute.

In other embodiments, the system can determine a writing style of the draft based on the textual analysis. Word relevance scores and/or probabilistically weighted distances can be computed by statistically determining each word's relevance score based on the writing style.

It is understood that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
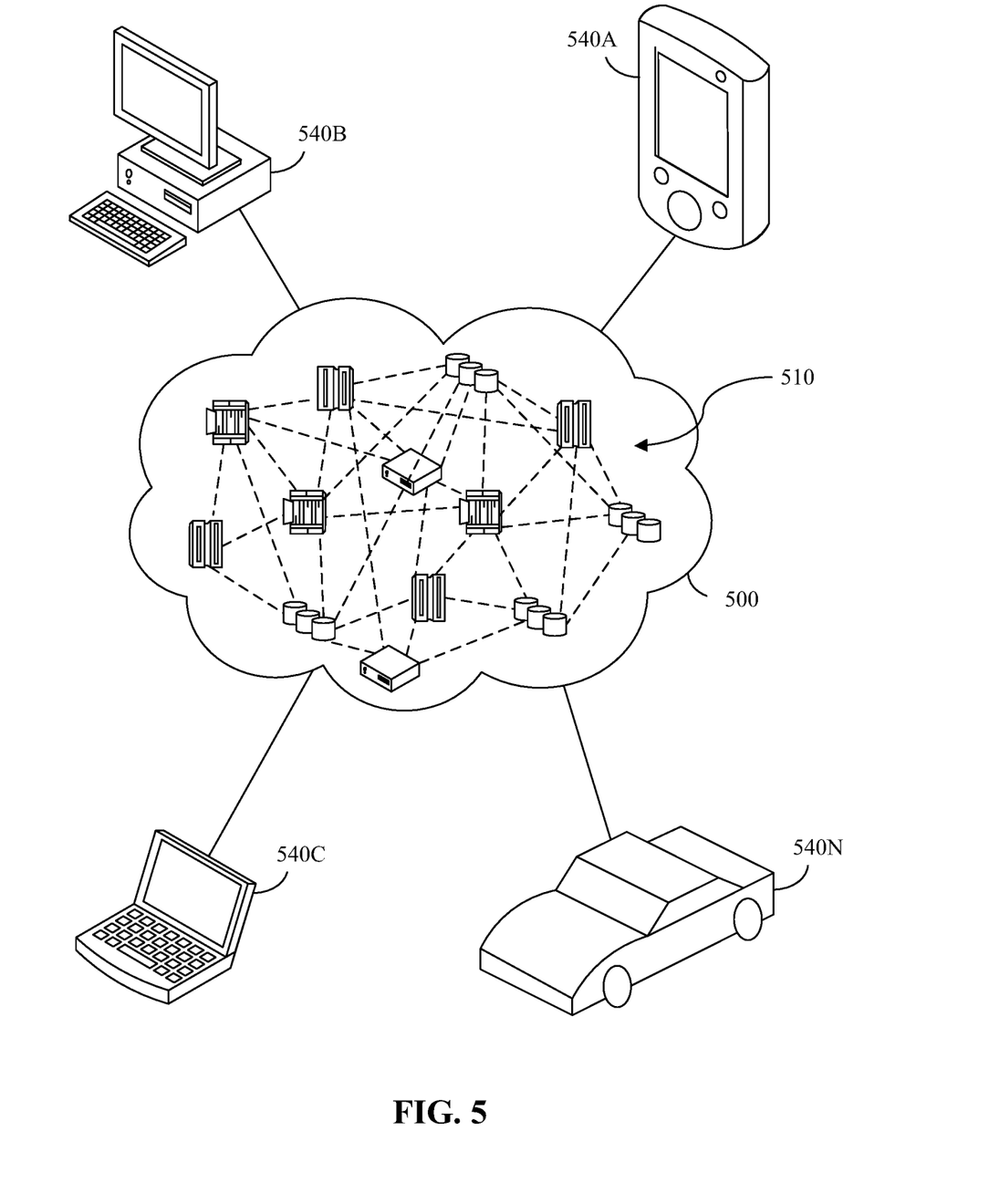
FIG. 5 depicts a cloud computing environment according to an embodiment.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540a, desktop computer 540b, laptop computer 540c, and/or automobile computer system 540n may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54a-n shown in FIG. 5 are intended to be illustrative only and that computing nodes 510 and cloud computing environment 500 can communicate with any type of computerized device over any type of network and/or network addressable connection (e.g., using a web browser).

Figure 6:
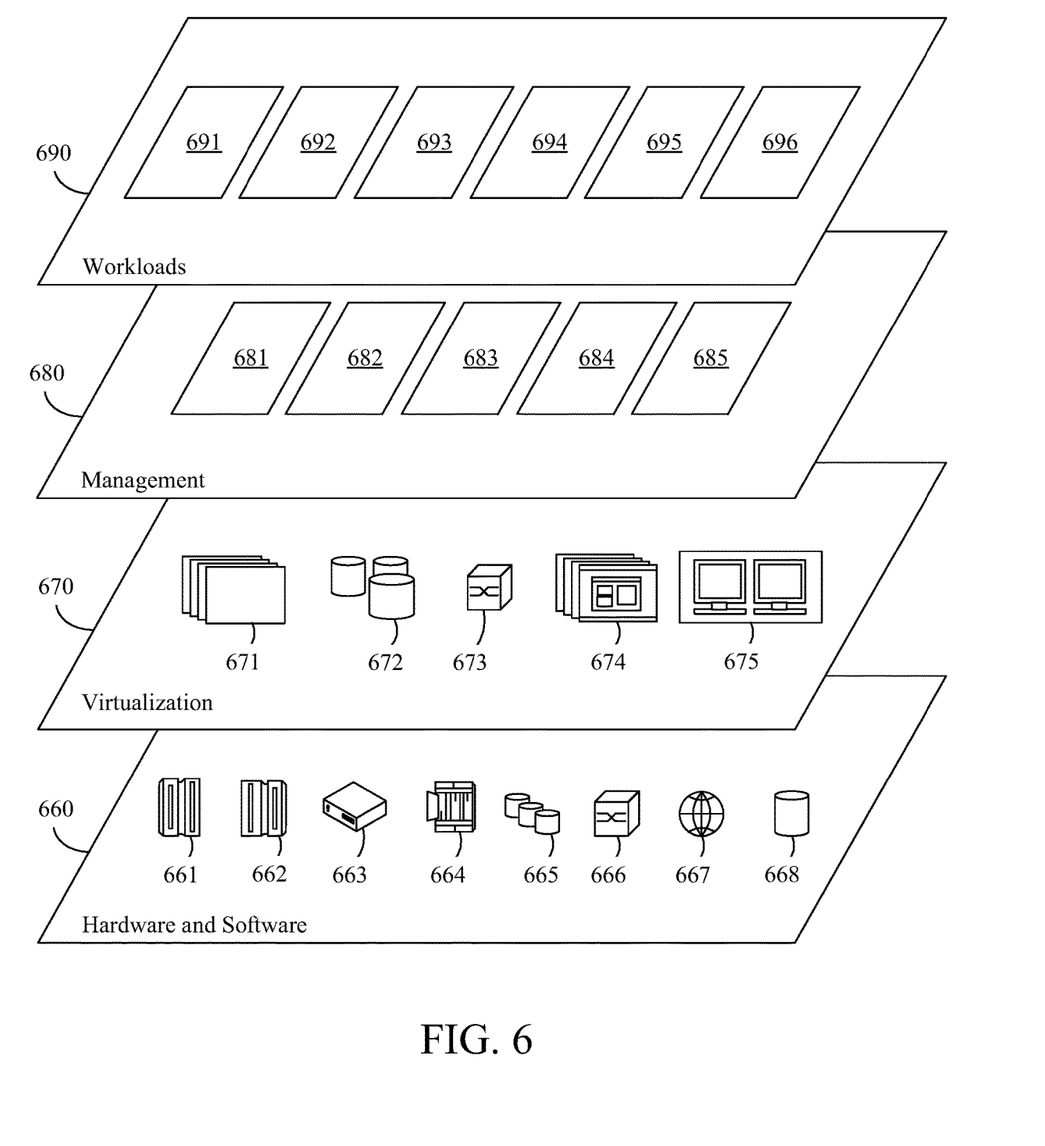
FIG. 6 depicts abstraction model layers according to an embodiment.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 6663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA. Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and participant inclusion system 696.

Figure 7:
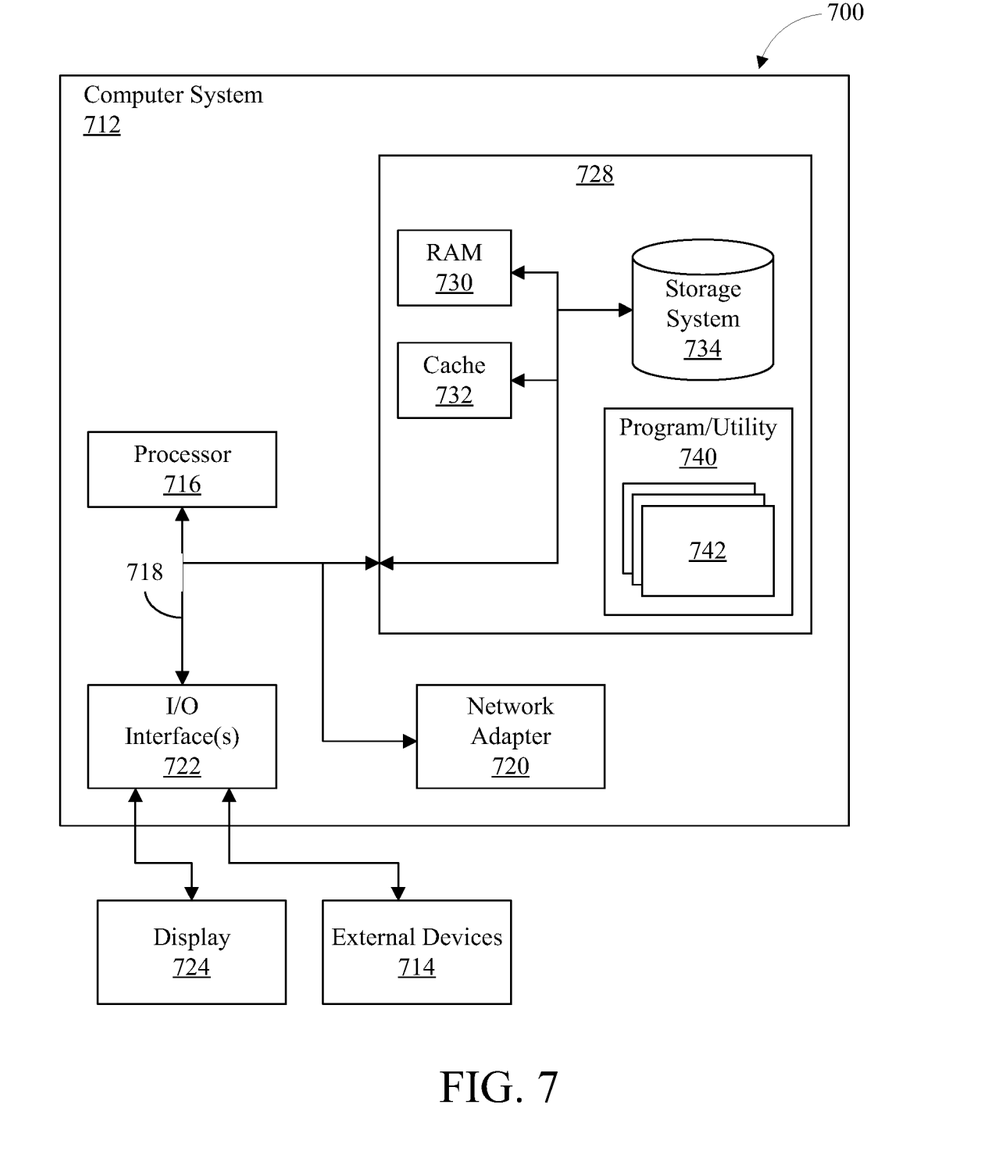
FIG. 7 depicts a cloud computing node according to an embodiment.

FIG. 7 illustrates a schematic of an example of a computing node 700. In one or more embodiments, computing node 700 is an example of a suitable cloud computing node. Computing node 700 is not intended to suggest any limitation as to the scope of use or functionality of embodiments of the invention described herein. Computing node 700 is capable of performing any of the functionality described within this disclosure.

Computing node 700 includes a computer system 712, which is operational with numerous other general-purpose or special-purpose computing system environments or configurations. Examples of well-known computing systems, environments, and/or configurations that may be suitable for use with computer system 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 712 may be described in the general context of computer system-executable instructions, such as program modules, being executed by a computer system. Generally, program modules may include routines, programs, objects, components, logic, data structures, and so on that perform particular tasks or implement particular abstract data types. Computer system 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system 712 is shown in the form of a general-purpose computing device. The components of computer system 712 may include, but are not limited to, one or more processors 716, a memory 728, and a bus 718 that couples various system components including memory 728 to processor 716. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

Bus 718 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 712 typically includes a variety of computer system-readable media. Such media may be any available media that is accessible by computer system 712, and may include both volatile and non-volatile media, removable and non-removable media.

Memory 728 may include computer system readable media in the form of volatile memory, such as random-access memory (RAM) 730 and/or cache memory 732. Computer system 712 may further include other removable/non-removable, volatile/non-volatile computer system storage media. By way of example, storage system 734 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein. For example, one or more of the program modules may include participant inclusion system 696 or portions thereof.

Program/utility 740 is executable by processor 716. Program/utility 740 and any data items used, generated, and/or operated upon by computer system 712 are functional data structures that impart functionality when employed by computer system 712. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 712 may also communicate with one or more external devices 714 such as a keyboard, a pointing device, a display 724, etc.; one or more devices that enable a user to interact with computer system 712; and/or any devices (e.g., network card, modem, etc.) that enable computer system 712 to communicate with one or more other computing devices. Such communication can occur via input/output (I/O) interfaces 722. Still, computer system 712 can communicate with one or more networks such as a local area network (LAN), a general wide area network (WAN), and/or a public network (e.g., the Internet) via network adapter 720. As depicted, network adapter 720 communicates with the other components of computer system 712 via bus 718. It should be understood that although not shown, other hardware and/or software components could be used in conjunction with computer system 712. Examples, include, but are not limited to: microcode, device drivers, redundant processing units, external disk drive arrays, RAID systems, tape drives, and data archival storage systems, etc.

While computing node 700 is used to illustrate an example of a cloud computing node, it should be appreciated that a computer system using an architecture the same as or similar to that described in connection with FIG. 7 may be used in a non-cloud computing implementation to perform the various operations described herein. In this regard, the example embodiments described herein are not intended to be limited to a cloud computing environment. Computing node 700 is an example of a data processing system. As defined herein, "data processing system" means one or more hardware systems configured to process data, each hardware system including at least one processor programmed to initiate operations and memory.

Computing node 700 is an example of computer hardware. Computing node 700 may include fewer components than shown or additional components not illustrated in FIG. 7 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 700 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, "output" means storing in physical memory elements, e.g., devices, writing to display or other peripheral output device, sending or transmitting to another system, exporting, or the like.

As defined herein, the phrases "in response to" and "responsive to" means responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "sender," "initial recipient," "recipient candidate," and "member," as well as plural forms of the terms, each refer to human beings. Likewise, as defined herein "users," "individuals," and "participants" refer to human beings.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method using a computer hardware system having a participant inclusion system, comprising:
   receiving, from a messaging platform, electronic information including:
      an electronic draft of an electronic communication,
      a sender of the electronic communication, and
      an initial recipient of the electronic communication;
   selecting, based on word relevance scores and probabilistically-weighted distances, one of a plurality of recipient candidates for receiving the electronic communication; and
   causing the messaging platform to automatically populate the electronic communication, as an added recipient of the electronic communication, with the selected one of the plurality of recipient candidates, wherein
   the participant inclusion system is operatively coupled with the messaging platform and configured to:
      compute the word relevance scores for each word in the electronic draft,
      determine the probabilistically-weighted distances between the sender, the initial recipient of the electronic communication, and each of the plurality of recipient candidates, and
      cause the electronic communication to be automatically directed, via the messaging platform, to the selected one of the plurality of recipient candidates,
   the selected one of the plurality of recipient candidates is logically linked with a member of an organization associated with the sender, the initial recipient, and the plurality of recipient candidates, and the messaging platform automatically populates the electronic draft with the member as another added recipient of the electronic communication, and a number of the selected at least one of the plurality of recipient candidates is less than a number of plurality of recipient candidates thereby reducing a number of electronic communications being sent by the messaging platform and increasing an operative capacity of the messaging platform.

2. The method of claim 1, wherein the messaging platform is configured to de-select the selected one of the plurality of recipient candidates, and the messaging platform is configured to automatically de-populate the electronic draft with the member based upon the selected one of the plurality of recipient candidates being de-selected.

3. The method of claim 1, wherein a hierarchical structure includes, for each respective member of the organization, an organizational attribute associated therewith, and the organizational attribute corresponds to a role within the organization for the respective member.

4. The method of claim 3, wherein the participant inclusion system is configured to:

identify that the selected one of the plurality of recipient candidates has been replaced in a role within the organization, select a replacement recipient for the selected one of the plurality of recipient candidates, and cause the messaging platform to automatically replace, as the added recipient of the electronic communication, the selected one of the plurality of recipient candidates with the replacement recipient, and the replacement recipient and the selected one of the plurality of recipient candidates share a common organizational attribute.

\* \* \* \* \*